United States Patent Office 2,703,314
Patented Mar. 1, 1955

2,703,314

PROCESS OF PREPARING AN AQUEOUS SILICA SOL

Lawrence A. Dirnberger, Berea, Ohio, assignor to E. I. du Pont de Nemours & Company, Wilmington, Del., a corporation of Delaware No Drawing. Application December 15, 1948, Serial No. 65,511

7 Claims. (Cl. 252—313)

This invention relates to ion-exchange processes and more particularly to processes for producing aqueous silica sols by removing metal ions from aqueous metal silicate solutions in which the metal silicate solution is caused to flow upwardly in contact with a particulate ion-exchange material at such a rate that the ion-exchange material is suspended in the solution.

Ion-exchange processes have hitherto been used mainly with dilute solutions for removing relatively small proportions of undesired ions. In the case of zeolite water softeners, for instance, the problem is to remove such undesired ions as calcium and magnesium, these ions being present at most as only a few hundred parts per million of water. At such dilutions solutions flow freely through the ion-exchange materials and practically the only problem is to regenerate the zeolite after it has become saturated.

More recently, ion-exchange processes have been proposed as a means for producing chemical solutions. In U. S. Patent 2,244,325 to Paul G. Bird it has been proposed, for instance, to make silica sols by passing sodium silicate solutions through ion-exchange material. Although the Bird patent disclosed the use of higher concentrations than heretofore customary in ion-exchange processes, the solutions were nevertheless relatively dilute, containing about from 3 to 3.5 per cent $SiO_2$ and the equivalent amount of $Na_2O$ as derived from a sodium silicate having an $SiO_2:Na_2O$ weight ratio of 3.25. The Bird patent recognized that such dilute solutions are of limited usefulness, and disclosed that the solutions could be concentrated, preferably by vacuum evaporation, to 6 per cent $SiO_2$. For economic handling and use silica sols should contain even more than 6 per cent $SiO_2$, and it will be evident that concentration from, say, 3.5 per cent up to a practical concentration of, say, 15 or 20 per cent or more, involves an undue expenditure for evaporation.

Experience with the processes of the Bird patent has shown, however, that a 3.5 per cent $SiO_2$ silica sol is about as high as it is possible to make by the usual methods of ion-exchange. Such methods customarily employ a bed of ion-exchange resin in the form of particles of .02 to 0.2 inch average diameter and pass the solution down through this resin bed. It is found that with solutions containing more than about 3.5 per cent $SiO_2$ the bed channels, that is, upon repeated cycles the resin cakes and becomes coated with silicic acid and the flow is through a few channels rather than uniformly over the whole bed. Thus the concentration of silica in the effluent has been limited heretofore and the expense of evaporation of very dilute solutions has been unavoidable.

Now according to the present invention it has been found that the use of higher concentrations of metal silicates in solutions for making silica sols by ion-exchange is made practical and feasible by processes comprising causing the metal silicate solution to flow upwardly in contact with a particulate ion-exchange material at such a rate that the ion-exchange material is suspended in the solution. The effluent sol may thus contain substantially more than 3.5 per cent $SiO_2$ and evaporation costs are proportionately decreased.

By a process of this invention a metal silicate solution, such as sodium silicate, containing up to 6 per cent $SiO_2$ may be employed and the effluent sol may thus contain up to 6 per cent $SiO_2$, without any difficulty due to coating of the ion-exchange resin or channeling of the bed.

In practicing the invention the metal silicate solution used may be made by dissolving any soluble metal silicate, such as sodium or potassium silicate. The solution may contain other metal salts, such as sodium aluminate, sodium zincate, sodium stannate, or sodium columbate, whereby the effluent sol will contain colloidal oxides of the aluminum, zinc, tin, or columbium, respectively. The processes have particular usefulness in such combinations, where the problems of avoiding precipitation and consequent channeling are particularly troublesome.

The ion-exchange material used may be such a material as those described in the Bird patent, or may be any material which is capable of abstracting sodium ions from sodium silicate solutions. It should be particulate in form; that is, it should be in such a state of sub-division that it may be easily kept suspended by the upward flow of the solution.

Any insoluble cation-exchanger in its hydrogen form may be used in processes of the invention and there may be used for instance the hydrogen form of sulfonated carbonaceous exchangers or of sulfonated or sulfited insoluble phenol-formaldehyde resins or acid-treated humic material or other similar exchangers. Sulfonated coal, lignin, peat, or other insoluble sulfonated humic organic material may be used. Even more preferable are the insoluble resins made from phenols, such as those made from phenol itself, diphenylol sulfone, catechol, or naturally occurring phenols as found, for example, in quebracho, and an aldehyde, particularly formaldehyde, which are modified by the introduction of sulfonic groups either in the ring or on methylene groups. Cation exchangers which are stable in their hydrogen forms are available commercially under such trade names as "Amberlite," "Ionex," "ZeoKarb," "Nalcite," "Ionac," etc.

The exchanger is generally prepared in a granular form which is readily leached free of soluble acids or salts. If the exchangers are partially or wholly in a salt form they may be converted to their acid forms by washing with a solution of an acid such as hydrochloric, sulfuric, formic, sulfamic, or the like. Excess acid may then be rinsed from the product. A description of such materials and of their use will be found, for instance, in the Bird Patent 2,244,325 previously mentioned and also in the Hurd Patent 2,431,481. The literature is also full of references to these materials and to their applications. One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11, beginning at page 2830.

In practicing this invention the ion-exchange material is placed in a suitable container and the solution is caused to flow upwardly in contact with it. Customarily the container is in the form of a vertical column so that the ion-exchange material is present as a bed of substantial depth. This insures maximum opportunity for contact. The height of the column must be sufficient to allow expansion of the bed when it is suspended by the upward flow of the solution. The extent of suspension need not be great, however, and it is sufficient if the bed is only sufficiently extended to permit the particles to move around freely.

The rate of flow needed for extending the bed depends upon such factors as the viscosity of the solution, the size of the ion-exchange particles and the density of the solution. If desired, the column may be provided with a sight glass so that the extent of suspension of the ion-exchange material may be observed visually.

Advantages are gained by the practice of this invention in the ion-exchange step as above described. Further advantages are realized in cyclic operations, such as must be employed for the most economic application of ion-exchange processes. Thus, the passage of the metal silicate solution through the exchanger may be followed by a water wash, also flowing upwardly at a rate sufficient to keep the particles of ion-exchange material suspended. This simplifies the washing procedure, makes it more effective, and reduces the amount of wash water required. The preferred practice is to carry out the ion-exchange step and immediately displace the residual solution with water, before allowing the particles of ion-exchange material to settle in contact with each other.

The nature of this invention and its manner of application will be better understood by reference to the following illustrative example.

*Example*

A sodium silicate solution containing 4 per cent by weight of $SiO_2$ was made up by diluting a commercial water glass solution known as "F-Grade" containing $SiO_2$ and $Na_2O$ in the weight ratio of 3.25:1. This diluted solution was then caused to flow upwardly through a column containing a bed of an acid-regenerated ion-exchange resin known as "Nalcite HCR." This resin was in the form of spheres of about from $1/_{16}$ to $3/_{16}$ inch average diameter. The rate of flow was adjusted so that the resin was in a suspended condition as determined by visual observation. The depth of the resin bed was sufficient to remove substantially all of the sodium ions from the sodium silicate solution in a single pass upward through the column.

The effluent silica sol contained about 4 per cent $SiO_2$ and was found to be in a satisfactory condition for concentration to a higher silica content.

By comparison, in the same equipment and using the same resin bed according to the customary downflow procedure the 4 per cent $SiO_2$ sodium silicate solution was found to cause excessive caking of the resin with the result that the effectiveness of the bed for ion-exchange was almost totally destroyed.

I claim:

1. In a process for producing an aqueous silica sol by removing metal ions from an aqueous metal silicate solution the step comprising causing the metal silicate solution to flow upwardly through a treating zone and effecting contact with a particulate cation-exchange material in the treating zone, the rate of flow being such that the cation-exchange material is suspended in the solution but does not move out of the treating zone.

2. In a process for producing an aqueous silica sol by removing sodium ions from an aqueous sodium silicate solution the step comprising causing the sodium silicate solution to flow upwardly through a treating zone and effecting contact with a particulate cation-exchange material in the treating zone, the rate of flow being such that the cation-exchange material is suspended in the solution but does not move out of the treating zone.

3. In a process for producing an aqueous silica sol by removing metal ions from an aqueous metal silicate solution the steps comprising causing the metal silicate solution to flow upwardly through a treating zone and effecting contact with a particulate cation-exchange material in the treating zone, the rate of flow being such that the cation-exchange material is suspended in the solution but does not move out of the treating zone, and thereafter, while the cation-exchange material remains suspended, causing water to flow upwardly in contact with it as such a rate that it is suspended in the water, whereby residual silica sol is washed out.

4. In a process for producing an aqueous silica sol by removing sodium ions from an aqueous sodium silicate solution the steps comprising causing the sodium silicate solution to flow upwardly through a treating zone and effecting contact with a particulate cation-exchange material in the treating zone, the rate of flow being such that the cation-exchange material is suspended in the solution but does not move out of the treating zone, and thereafter, while the cation-exchange material remains suspended, causing water to flow upwardly in contact with it at such a rate that it is suspended in the water, whereby residual silica sol is washed out.

5. In a process for producing an aqueous silica sol by removing metal ions from an aqueous metal silicate solution the steps comprising causing a solution containing a dissolved metal silicate, at a concentration equivalent to more than 3.5% $SiO_2$, to flow upwardly through a treating zone, and effecting contact with a particulate cation exchange material in the treating zone, the rate of flow being such that the cation exchange material is suspended in the solution but does not move out of the treating zone.

6. In a process for producing an aqueous silica sol by removing sodium ions from an aqueous sodium silicate solution the steps comprising causing a solution containing dissolved sodium silicate, at a concentration equivalent to more than 3.5% $SiO_2$, to flow upwardly through a treating zone, and effecting contact with a particulate cation exchange material in the treating zone, the rate of flow being such that the cation exchange material is suspended in the solution but does not move out of the treating zone.

7. In a process for producing an aqueous silica sol by removing sodium ions from an aqueous sodium silicate solution the steps comprising causing a solution containing dissolved sodium silicate, at a concentration equivalent to more than 3.5% $SiO_2$, to flow upwardly through a treating zone, and effecting contact with a particulate cation exchange material in the treating zone, the rate of flow being such that the cation exchange material is suspended in the solution but does not move out of the treating zone, and thereafter, while the cation exchange material remains suspended, causing water to flow upwardly in contact with it at such a rate that it is suspended in the water, whereby residual silica sol is washed out.

References Cited in the file of this patent

UNITED STATES PATENTS

| | | |
|---|---|---|
| 1,617,288 | Kenney | Feb. 8, 1927 |
| 1,845,058 | Pier | Feb. 16, 1932 |
| 2,244,325 | Bird | June 3, 1941 |
| 2,438,230 | Ryznar | Mar. 23, 1948 |
| 2,457,971 | Voorhees | Jan. 4, 1949 |